United States Patent [19]

Reinholm et al.

[11] 4,450,727
[45] May 29, 1984

[54] DIGITAL RETORQUE MEASURING APPARATUS

[75] Inventors: James H. Reinholm, Livonia; Eugene J. Marcinkiewicz, Plymouth, both of Mich.

[73] Assignee: GSE, Inc., Farmington Hills, Mich.

[21] Appl. No.: 372,878

[22] Filed: Apr. 29, 1982

[51] Int. Cl.³ .......................................... B25B 23/142
[52] U.S. Cl. .................................. 73/862.23; 73/761; 364/508
[58] Field of Search ..................... 73/761, 847, 862.23, 73/862.24; 364/505, 505, 508

[56] References Cited

U.S. PATENT DOCUMENTS

| | | | |
|---|---|---|---|
| 4,244,213 | 1/1981 | Marcinkiewicz | 73/862.23 |
| 4,259,869 | 4/1981 | Carlin | 73/761 |
| 4,319,494 | 3/1982 | Marcinkiewicz | 73/862.23 |

Primary Examiner—Charles A. Ruehl
Attorney, Agent, or Firm—Krass & Young

[57] ABSTRACT

A microcomputer based system is designed to accurately detect the amount of previously applied torque to a fastener by way of a retorque test in which torque is subsequently applied to the fastener in the tightening direction until breakaway occurs. As torque is subsequently applied to the fastener a microprocessor operates to sample an analog torque input signal and convert it into discrete digital samples. These digital samples are stored in sequential memory locations during the tightening process. The microprocessor stops generating any further samples once a window containing the values of interest has been defined in memory. Then, the microprocessor examines the stored window samples in more detail to detect the sample value associated with the amount of torque previously applied to the fastener.

10 Claims, 16 Drawing Figures

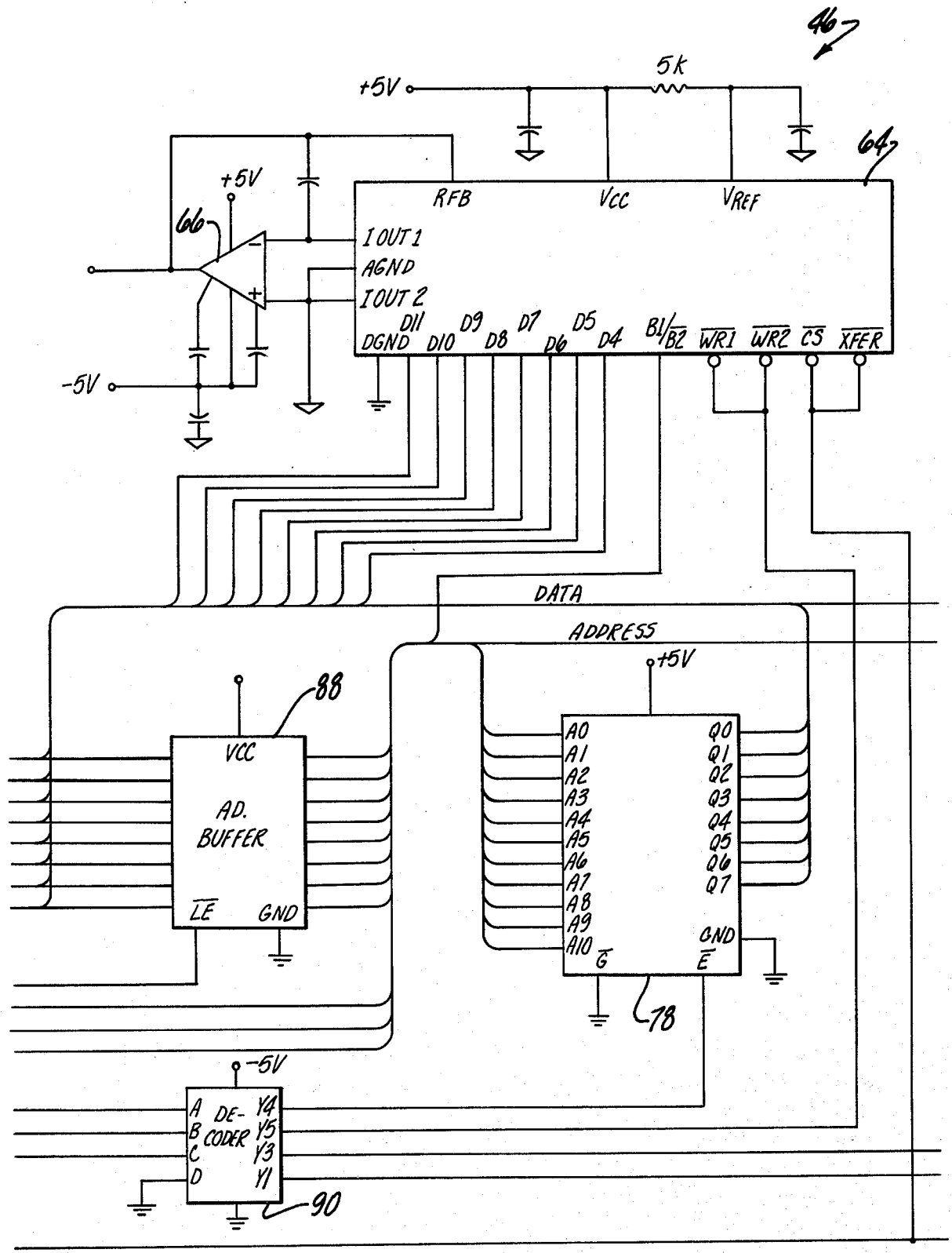
IFig-4B

DIGITAL RETORQUE MEASURING APPARATUS

DESCRIPTION

1. Technical Field

This invention relates to torque measuring systems and, more particularly, it involves techniques for sensing the amount of previously applied torque to a fastener.

2. Background Art

In a variety of manufacturing applications it is often imperative that a predetermined amount of torque be applied to a fastener to form a proper joint. For example, in automotive applications bolts must be tightened within a certain prescribed range of torque to properly join two parts together thereby assuring good reliability of the joint during expected use. A relatively simple test has been used in the past to measure fastener torque levels. An operator uses a hand torque wrench to engage the fastener to be tested. He then uses the wrench to apply more torque to the fastener until it finally begins to rotate in the tightening direction. Early techniques called for the operator to merely view the reading of the wrench torque indicator just prior to the "give" or "breakaway" of the fastener as this torque level was thought to be generally associated with the amount of torque originally applied to the fastener during the normal assembly process. Later improvements of such a test included the use of a wrench which would maintain the position of the indicator at the maximum torque level experienced.

Unfortunately, the prior art methods of sensing the applied torque were not very precise and the results were not capable of being accurately reproduced from operator to operator. The breakaway torque level was hard to accurately measure because it was difficult for the operator to instantaneously stop applying any more torque as soon as he noticed fastener motion. Hence, the torque reading was often too high due to this overshooting problem.

U.S. Pat. No. 4,244,213 and U.S. Pat. No. 4,319,494 to Marcinkiewicz (hereby incorporated by reference) disclose dramatic improvements in retorque measuring techniques. These patents broadly disclose the concept of electronically and automatically detecting the amount of previously applied torque to a fastener. In general, electrical circuitry is used to automatically detect a change in slope of the torque signal. The torque value associated with the occurrence of the slope change was displayed as being representative of the amount of torque previously applied to the fastener. Preferably, the circuitry was adapted to detect the torque signal value associated with a negative valley occuring after the breakaway point. This negative valley torque, when it occurs, provides an even better indication of the amount of torque applied to the fastener during its original tightening process.

While the above commonly assigned patents certainly advanced the state of the art, the particular embodiments disclosed therein for carrying out their broad teachings can be even further improved. Spurious peaks or spikes in the torque signal are often encountered under true operating conditions. These spikes can be generated by things like electrical noise but generally they are due to the operator "jerking" the wrench during the test instead of smoothly applying the torque to the fastener. Unfortunately, the analog circuit approach of the previous patents cannot readily filter out those signals. Since their detection schemes look for changes in relative torque values these spikes could trigger false readings.

The present invention is directed to solving one or more of these problems.

DISCLOSURE OF THE INVENTION

The present invention is broadly directed to a digital torque detection scheme centering around the use of a microprocessor to convert an analog torque signal into discrete digital sample values which are stored and then examined in more detail for given characteristics. During the retorque or retightening process, the microprocessor is devoted almost exclusively to the task of converting the analog input signal into discrete samples. It is not burdened with the chore of making relatively sophisticated calculations during the time that the input data is being received. Instead, it performs only relatively simple calculations necessary to define a "window" subset of the samples where the breakaway or negative valley torque values are expected to be found.

In the preferred embodiment, the microprocessor operates generally to detect a change in slope in the torque curve by subtracting two end points of relatively wide segments and comparing the difference with the contents of a peak slope storage register. If the slope values of a given number of consecutive segments are substantially less than the peak slope value then the microprocessor "knows" that breakaway has occurred. The microprocessor continues to generate and store digital samples for a brief but sufficient period of time to encompass the negative valley region if a valley did, in fact, occur during the test. After the window has been defined, the microprocessor stops generating any further samples and, instead, enters a search mode for examining the data contained in the window in much more detail. In the disclosed example, the valley torque value is found by identifying a data sample followed by a relatively long number of decreasing data sample values. This effectively identifies the beginning of a valley and causes the microcomputer to store the most negative (i.e. least positive) sample value in a negative peak register. The value in the negative peak register is displayed when a certain number of more positive readings are encountered thus identifying the following "hill" of the valley. If there is no discernible valley torque level, the microprocessor branches to a routine for detecting the breakaway torque. According to the teachings of the preferred embodiment, the torque value associated with the intersection of projections from two specially defined segments in the window is displayed as the breakaway torque. One of the segments is associated with the minimum slope within the window whereas the other segment is the first one to deviate substantially from the contents of the peak slope register loaded during the "window definition" sequence. This technique will serve to consistently identify the breakaway torque value even though the torque curve may vary from that to be normally expected.

The technique of the present invention is particularly advantageous because it allows the microprocessor to generate many closely spaced samples since time consuming calculations are minimized during the fastener tightening process. Soon after breakaway is sensed, the microprocessor stops sampling the analog torque signal and now has plenty of time to go back into memory to calculate the breakaway or valley torque levels with great precision. Chances of error are minimized because the computer has time to look at many samples and may employ techniques to filter out invalid data signals from true trends in the torque curve.

BRIEF DESCRIPTION OF THE DRAWINGS

Those skilled in the art will come to appreciate the full range of advantages of various features of this invention by reading the following specification and by reference to the drawings in which.

DESCRIPTION OF THE PREFERRED EMBODIMENT

Figure 1:
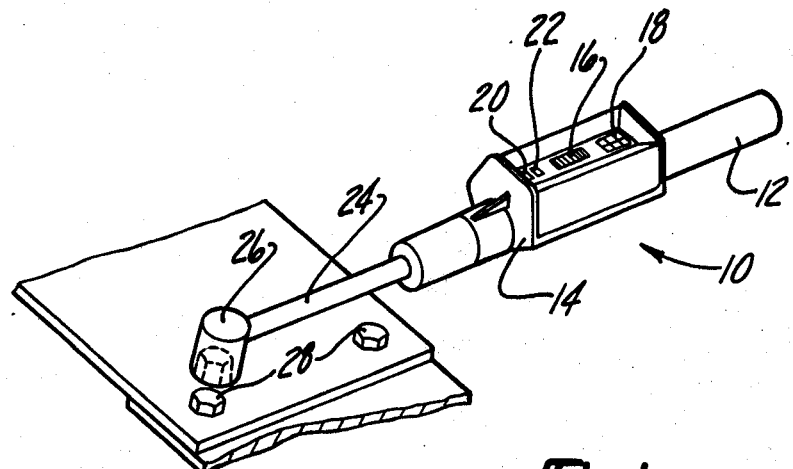
FIG. 1 is a perspective view illustrating a hand torque wrench which may embody the present invention.

FIG. 1 illustrates one example of a torque wrench testing device suitable for incorporating and using the teachings of the present invention. Torque wrench 10 includes a handle 12 on which housing 14 is mounted on intermediate portions thereof. The interior portion of housing 14 includes the components making up the electronic circuitry which will be described in detail later on in this specification. An LCD display 16, keyboard 18, rotation switch 20 and on/off switch 22 are provided on the top panel of housing 14. A shaft 24 attached to an opposite end of handle 12 includes a cylindrical head 26 at its end. Head 26 includes suitable strain gauges or other transducers therein for sensing the amount of torque applied to a fastener by wrench 10. A more detailed description of torque wrench 10 may be obtained by reference to U.S. Pat. No. 4,125,016 to Lehoczky et al issued Nov. 14, 1978, which is hereby incorporated by reference.

Torque wrench 10 is typically used to test the amount of previously applied torque to a fastener such as bolts 28. Head 26 of torque wrench 10 includes a suitable socket in its lower end for receiving the head of one of the bolts 28. The wrench is then rotated by the operator in the fastening or clamping direction until further rotational movement of bolt 28 is noted. This is commonly referred to in the industry as the "breakaway" of the fastener under test.

Figure 2:
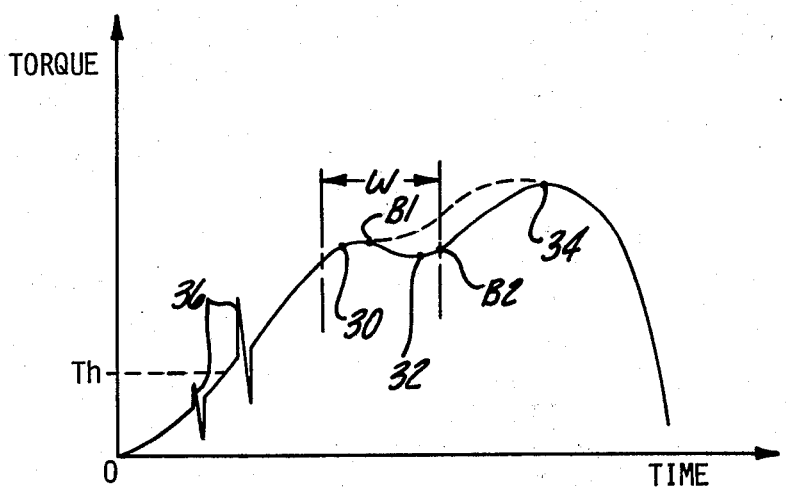
FIG. 2 is a typical torque curve that may be generated during the testing procedure according to the teachings of the present invention.

FIG. 2 shows a typical torque level signal curve that may be encountered in this type of retorqueing operation. The torque level increases linearly with applied force until such time as the fastener begins further rotational movement. This point shall be referred to as the breakaway torque level and is noted by the reference numeral 30. In many fasteners the torque level actually decreases for a short period of time even though the operator is still applying force to the fastener. This point is labeled with the reference numeral 32 and shall be referred to as the valley torque. As set forth in the above referenced patents to Marcinkiewicz, valley torque 32 provides a very close approximation of the amount of torque previously applied to the fastener. In some instances, however, the particular fastener under test does not develop a torque curve with a well defined valley. Instead, the slope of the torque curve merely changes to some minimum level at the breakaway point and then increases with further applied force. This is represented by the dotted line in FIG. 2. The torque level will then increase to a point labeled 34 until the operator ceases to apply further force to the wrench.

According to the teachings of the present invention, the valley torque value 32 is automatically and precisely identified or, if no valley occurs, the breakaway torque level is identified and displayed. The latter, while not being quite as accurate as the valley torque level, still does provide a close approximation of the amount of torque previously applied to the fastener under test.

Unfortunately, the input torque curve often encounters short-lived but highly fluctuating torque readings. These spikes often occur during the early phase of the retorqueing process and thus are shown in FIG. 2 in an exaggerated manner by reference numerals 36. As noted above, the spikes can be caused by electrical noise or by operator error in not smoothly applying force to the fastener under test. As will appear later herein the present invention provides the capability of precisely detecting the valley or breakaway torque levels in spite of the occurrence of such spikes.

Figure 3:
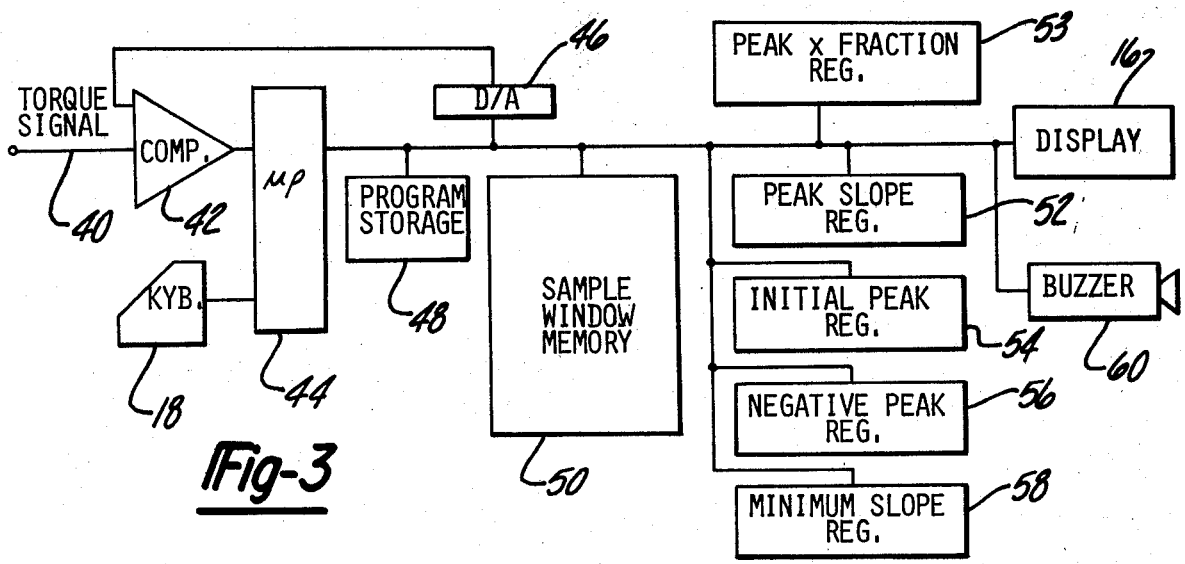
FIG. 3 is a block diagram of the electrical circuitry of the preferred embodiment.

Turning then to FIG. 3 there is disclosed a block diagram of the major functional components of the hardware for carrying out the objectives of the present invention. The analog input torque signal is supplied over line 40 to one input of a comparator network 42. The analog torque signal is representative of the amount of torque applied to the fastener. Typically, strain gauges in torque wrench head 26 are configured in a Wheatstone Bridge circuit whose output forms the analog torque signal.

The system employs a microprocessor 44 which forms the heart of a microcomputer system. Microprocessor 44 has an output which is connected to a digital to analog converter 46 whose output is coupled to another input of comparator 42. Under the control of a program within program storage memory 48 the microprocessor 44 uses a reiterative process to generate discrete digital samples from the analog input signal. The microprocessor 44 converts the output signal from comparator 42 into a binary number which is, in turn, converted back to an analog signal by way of D/A converter 46. The analog output of converter 46 is compared to the torque signal and fed back to the input of microprocessor 44. This interactive process is repeated until a binary number is found which matches the torque signal. The binary numbers or samples are stored in a random access memory 50 on a sequential first in/first out (FIFO) basis. Memory 50 serves as a window sample storage device for storing a subset of the digital samples associated with portions of the torque curve shown in FIG. 2.

According to the teachings of this invention, two broad functional steps are employed to ascertain the breakaway or valley torque values. The first step is to define the window of samples in memory 50. The window should be wide enough to encompass the breakaway torque value 30 and valley torque value 32. However, the size of the window should not be any larger than necessary. The next broad step is for the microprocessor 44 to examine or search all of the data values in the window for the precise breakaway or valley torque values. Memory 50 contains 128 samples in the preferred embodiment. During these steps registers 52-58 are utilized in the performance of certain calculations as will later be described. The detected breakaway or valley torque is then displayed on display 16. Alternatively, or in addition to display 16 there may be provided a printer for generating a hard copy of the test results. The system utilizes a buzzer or beeper 60 which will beep once if the value displayed is the breakaway torque and will beep twice if the value displayed is the valley torque.

Figure 4A:
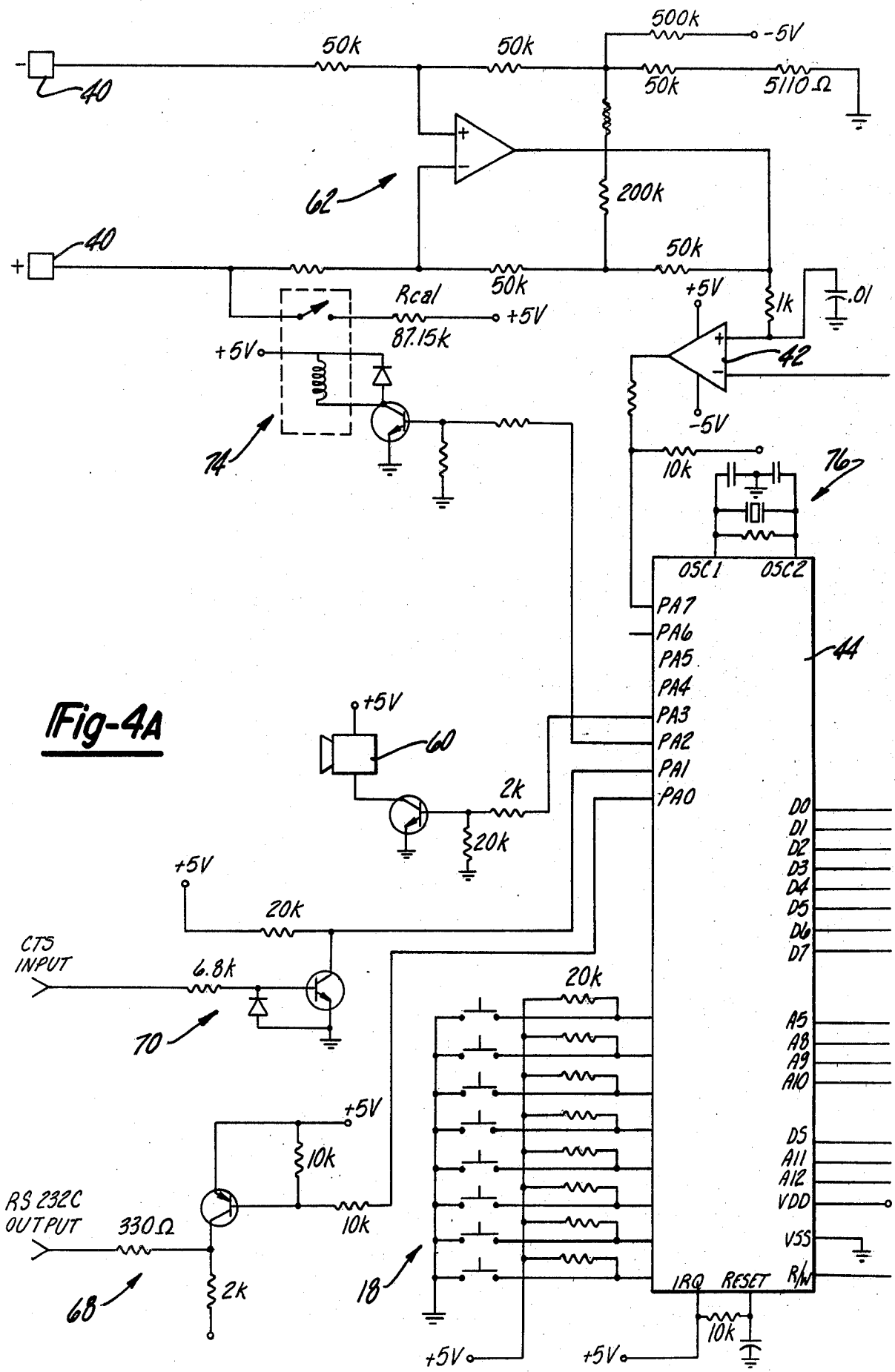
FIGS. 4 (A–C) comprise a schematic diagram showing the details of the electrical circuitry of the preferred embodiment.
Figure 4C:
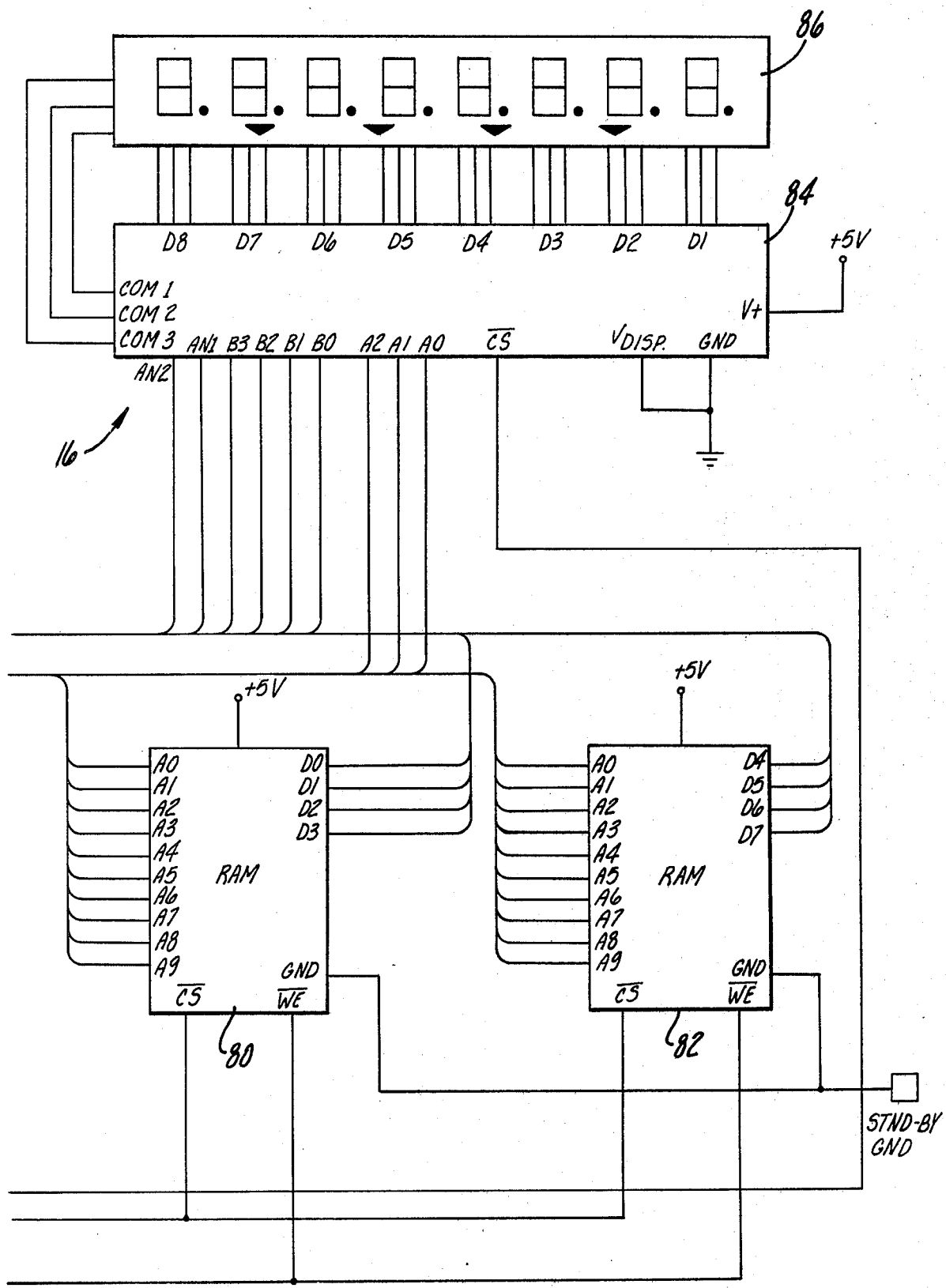

FIGS. 4 (A-C) comprise an electrical schematic of the components making up the system of the preferred embodiment. Microprocessor 44 is an eight bit microprocessor such as the Motorola MC146805. As known in the art, microprocessor 44 includes various input-/output ports for receiving and sending information. Among the inputs to microprocessor 44 are the switches associated with keyboard 18. Keyboard 18 allows the user to select various modes of operation and to enter control data values. For example, one mode that can be selected will cause the system to detect the absolute peak torque (peak mode) that is applied to the fastener under test. Another mode of operation adapts the system to track or display the instantaneous torque value. Of particular concern to the present invention is the retorque modes. The system can be programmed by the user in a first retorque mode to detect breakaway torque only or in a second retorque mode where the valley torque is displayed if one occurred during the test and, if not, then breakaway is displayed. The detection of the breakaway torque only follows the same operational steps as in the second mode of operation (except for the additional valley detection routine) and thus, the present invention will be described in connection with this second retorque mode of operation.

The operator can program in a threshold torque value and a sensitivity reference value that are designed to be used for the particular fastener checking test. As will become apparent later herein the threshold torque value is the value above which the microprocessor begins to save digital samples in memory. Normally, the threshold is set at a sufficiently high level that extraneous input signals generated during set up are effectively ignored. The sensitivity reference value is a fraction or percentage of the peak slope value below which will be used to trigger the window definition step of the system operational sequence. The importance of this sensitivity reference value will become apparent later herein. Suffice it to say that the user has a considerable degree of flexibility in defining the particular parameters of the test to be performed. This flexibility is especially advantageous due to the fact that the same torque wrench and detection system may be used for a wide variety of different fasteners, each having their own particular tightening characteristics.

The output from the strain gauge bridge or analog input signal is sensed by a differential amplifier 62 whose inputs are coupled to the two outputs of the bridge. The output of differential amplifier 62 thus is a voltage whose absolute magnitude is proportional to the amount of torque applied to the fastener. The output of differential amplifier 62 is connected to the noninverting input of comparator 42. The inverting input of comparator 42 is coupled to the output of digital to analog converter 46. The output of comparator 42 will either be a logical one or zero depending upon the relationship between the voltage values at its inputs. As long as the analog torque signal on the noninverting input is greater than that supplied by D/A converter 46 to the inverting input, microprocessor 44 will see a logical 1 at its input. As will be described in connection with the conversion routine the microprocessor generates a binary number and sends this number to the input of D/A converter 46. D/A converter 46 is a CMOS binary multiplying digital to analog converter using conventional ladder switching techniques to effect the conversion process. In this particular embodiment D/A converter 46 utilizes a DAC1232 component 64 made by National Semiconductor. The output of component 64 is coupled to an op amp 66 in the manner suggested by the component manufacturer. Op amp 66 serves as an inverting amplifier whose output has an absolute magnitude proportional to the digital value at the input to D/A converter 46.

Other inputs to microprocessor 44 may include circuitry generally designated by the numerals 68 and 70 for communicating with an optional printer. The circuitry 68 provides outputs to the printer whereas circuitry 70 accepts acknowledgement signals from the printer.

Circuitry 74 operates as a calibration circuit. When the system enters the calibration mode the relay in the circuit activates the switch which, in turn, couples the precision calibration resistor to amplifier 62 so that its output is equivalent to a full scale reading. Suitable calibration techniques may be then used to calibrate the system. The oscillator circuitry 76 generates the master clock signal for driving microprocessor 44 in the manner known in the art. Suitable circuitry for driving buzzer 60 is also connected to microprocessor 44.

The output of microprocessor 44 is connected to external memory devices and display 16 as well as to the D/A converter 46. The memory devices include a programmable read only memory 78 which contains the operating program for the microprocessor 44 and two random access memories (RAMs) 80 and 82. Display 16 includes a display driver component 84 for controlling the operation of a multidigit liquid crystal display (LCD) 86. The transfer of data within the system including the reading and writing of the memories are carried out in a manner known in the art and may include such devices as address buffer 88 and a binary to BCD decoder 90 serving as a chip selector.

Selected sections of RAM memories 80 and 82 are used as the window sample memory 50, peak slope register 52, peak x fraction register 53, initial peak register 54, negative peak register 56 and minimum slope register 58. Those skilled in the art will appreciate that the purpose of registers 52-58 is to temporarily store data and thus, the registers may be made up of individual storage devices or, as in the preferred embodiment, dedicated locations within a larger RAM memory. In fact, the internal memory (not shown) in microprocessor 44 may be used in some instances.

With additional reference to the flow chart of FIGS. 5 (A-J), the operation of the system of this invention will be described. When the user chooses either of the retorque modes of operation the microprocessor is instructed by the program shown in FIGS. 5 (A-J). Initially, all of the counters, registers and flags pertinent to this routine are cleared as illustrated in steps 100-112 (FIG. 5(A)). As the operator uses wrench 10 to apply torque to the fastener under test the analog torque signal is converted into digital values by way of the conversion routine shown in FIGS. 5G-J.

Figure 5A:
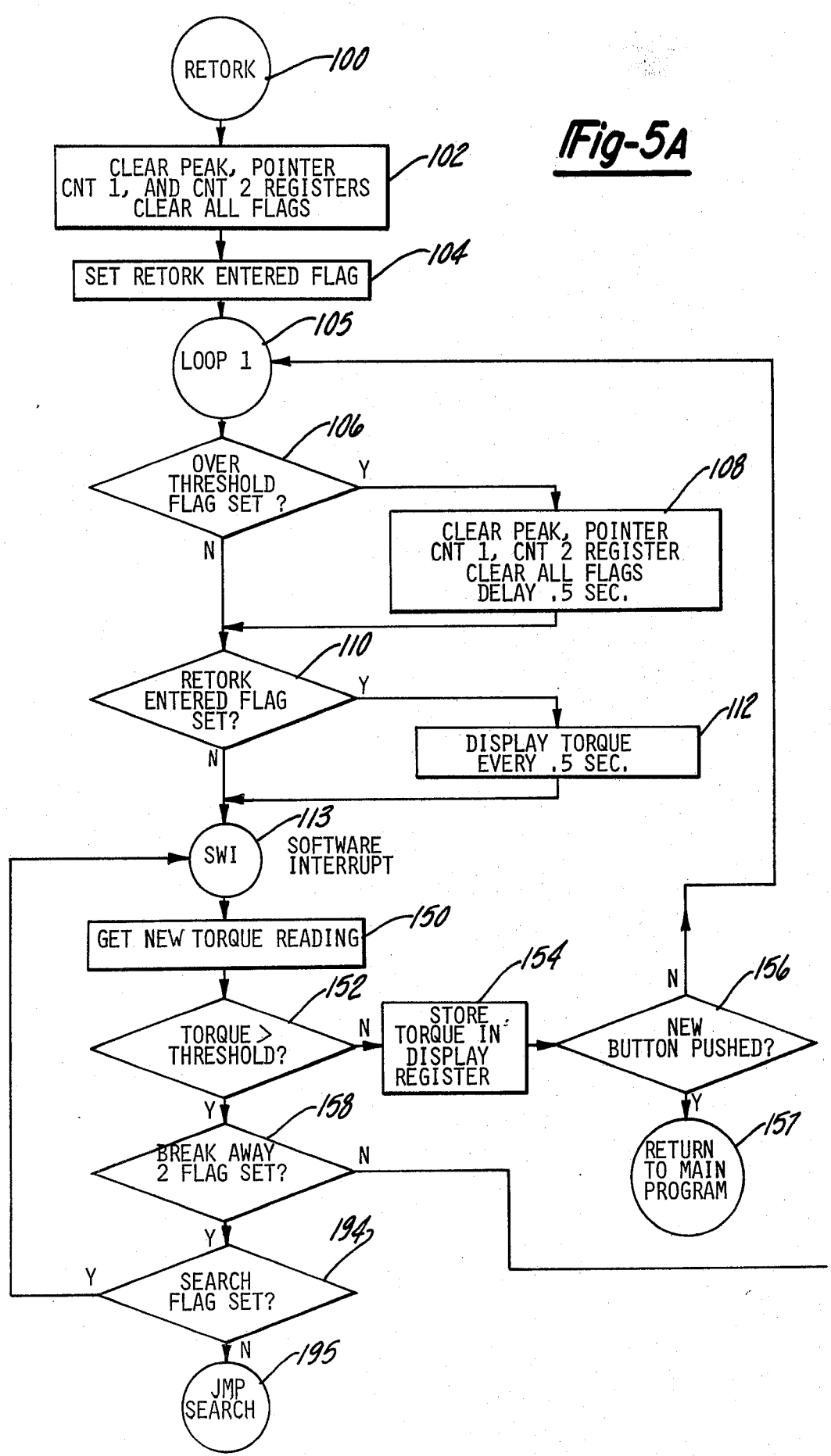
FIGS. 5 (A–J) comprise a flow chart illustrating sequential steps to be performed in carrying out various aspects of the preferred embodiment of the present invention.

The A/D conversion routine is entered by way of a software interrupt (SWI) which occurs about once every one millisecond to generate a digital sample with a value corresponding to the analog torque signal value occurring at the time the sample is taken. The microprocessor is designed to convert the analog signal into a precision twelve bit data value, even though the microcomputer system employs conventional eight bit processing techniques. FIG. 5G shows the steps used to generate the first eight bits of the digital sample value. Briefly, the most significant eight bits of the previous value which was stored in memory is fetched and fed to the input of D/A converter 46. After waiting about 2 $\mu$sec for the output of the D/A to be generated, the microprocessor determines whether that signal is greater or less than the analog torque signal. Depending on the outcome of those tests the microprocessor increases or decreases the value of the most significant eight bits of the sample value until approximate matching occurs. Then in FIG. 5J the microprocessor uses a successive approximation technique to set the lower four bits to the precise value. The upper eight bits are saved for the next conversion routine.

Returning to FIG. 5(A) each new torque reading is tested in step 152 to determine whether it is greater than the user programmed threshold value. As soon as this happens the microprocessor 44 will start storing successive samples in sequential locations in memory 50 as represented by step 160 and the address pointer is decremented to the next memory location (step 162). It should be realized that during a typical test over about a thousand number of samples will be taken. It would be wasteful of memory to have to store all of these samples since very few of them are really very pertinent. Therefore, a memory segment which is sufficiently large to store 128 samples is used as a recirculating buffer where the newest sample value takes the place of the oldest sample value. Of course, if economy is not of a great concern then a memory large enough to store all of the samples could be employed.

Figure 5B:
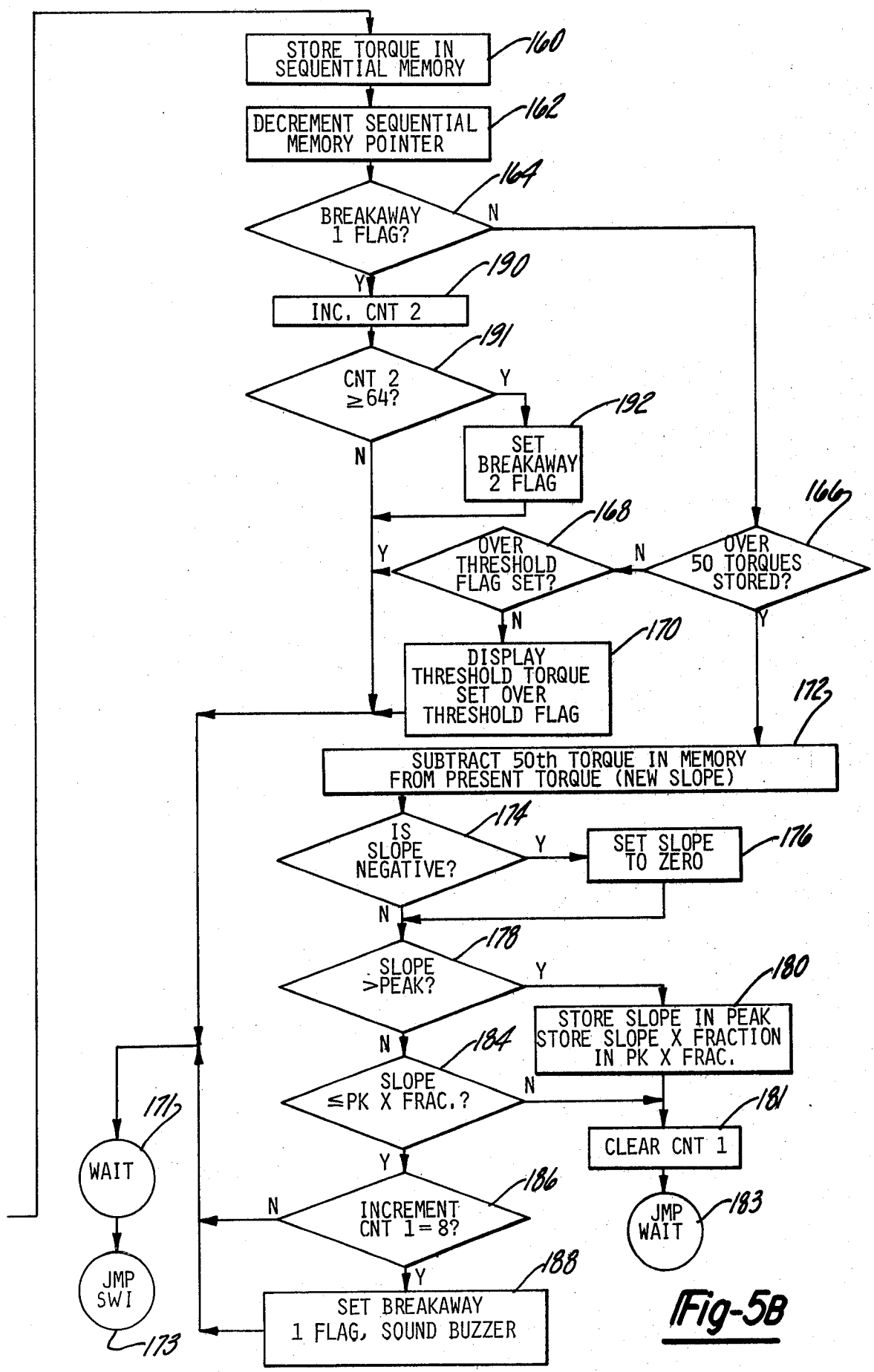
Figure 5C:
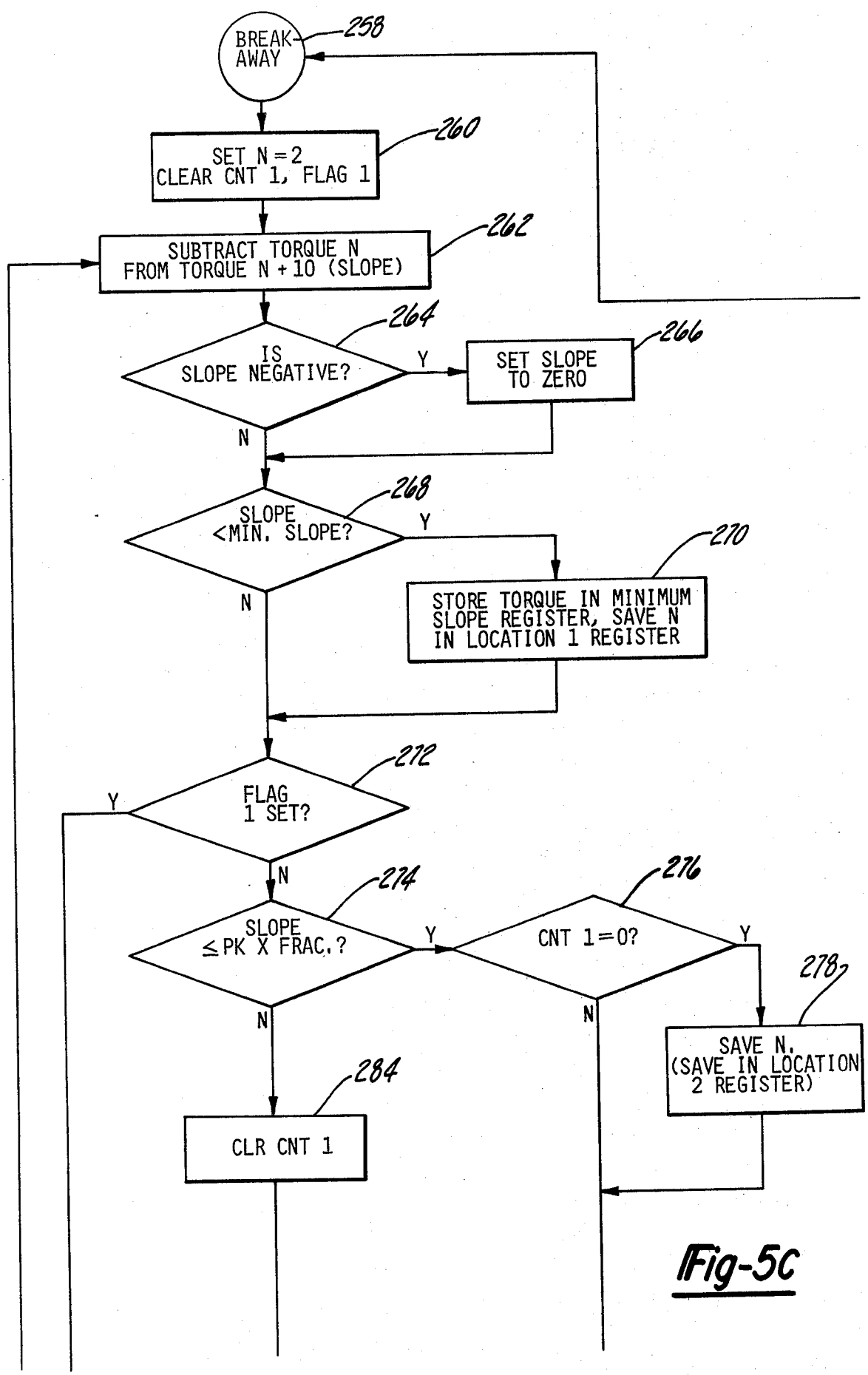
Figure 5D:
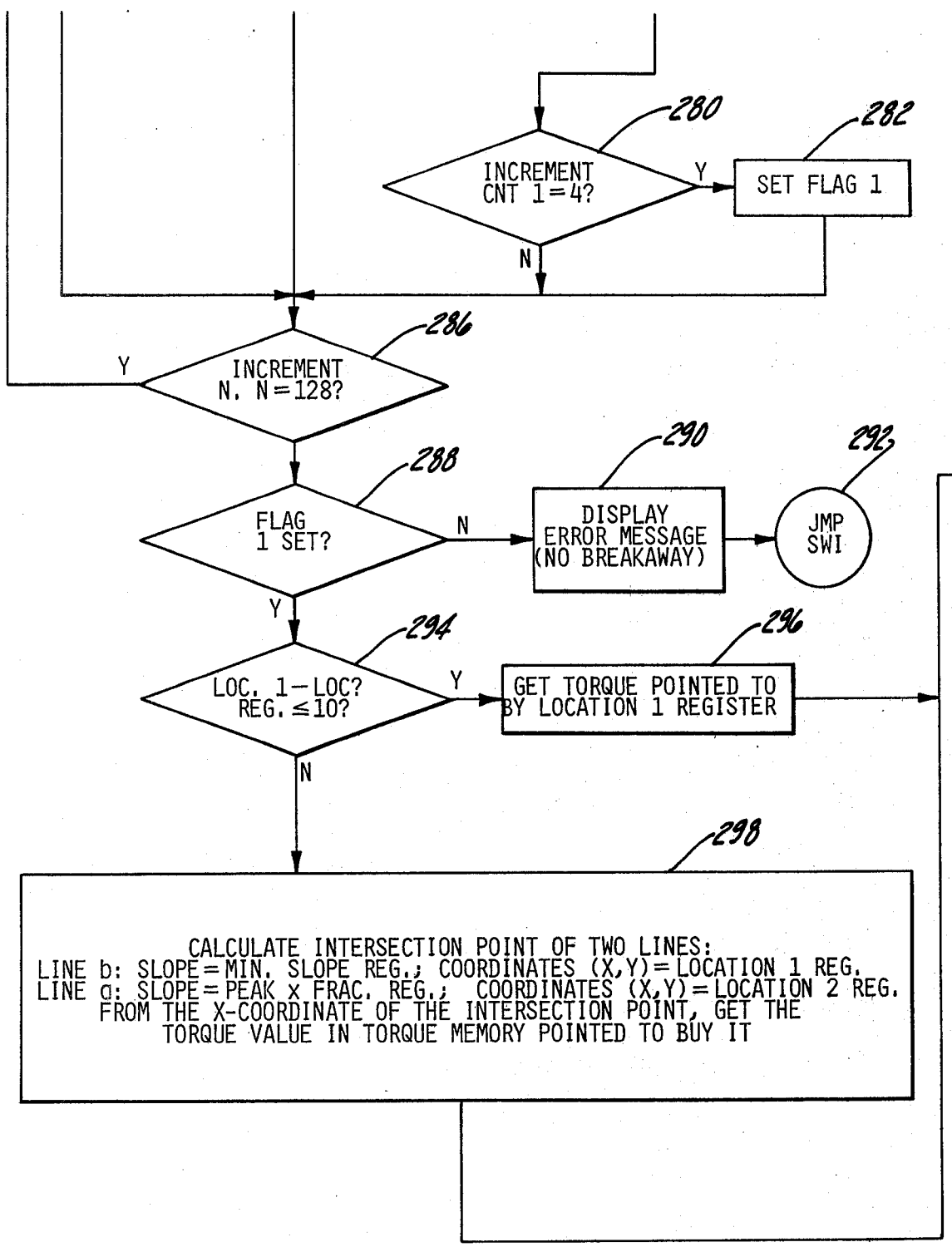

Test 166 (FIG. 5(B)) determines if at least 50 torque samples have been stored. If so, the microprocessor calculates the slope of a 50 sample wide segment. As reflected by step 172 this is accomplished by subtracting the value of the N-50 sample reading from the current or N sample value. In other words, the torque of the current data sample has subtracted from it the value of the 50th preceding sample. Since all of the samples are taken at equally spaced time intervals this simple subtraction process calculates the slope over a relatively wide segment of the torque/time curve represented in FIG. 2. If the current slope is greater than the maximum or peak slope that has been generated so far, the slope value is stored in a memory location corresponding to peak slope register 52. Additionally, the new peak slope value is multiplied by the user programmable sensitivity factor and loaded in the peak x fraction register 53. After registers 52 and 53 are loaded, a software counter referred to as counter No. 1 is cleared by operation 181. Software counters are well known in the art and generally consist of a given memory location whose contents are either incremented or decremented by control signals.

It should be appreciated that during the portion of the curve of FIG. 2 between the threshold level (Th) and breakaway 30 that the slopes of each of the segments will be substantially constant. Thus, the system generally passes through the preceding sequence of steps until the current slope is less than the contents of the peak x fraction register 53 as represented by the test block 184. When eight successive segments have slopes less than or equal to the contents of the peak x fraction register (test 186) operation 188 sets the breakaway 1 flag and buzzer 60 is beeped once.

It might be best to reflect on what has happened at this point. The object of this portion of the sequence is to start the definition of the window (labeled "W" in FIG. 2) which will be examined by the microprocessor in more detail later on. The window must be relatively small so as to minimize the examination time but it has to be sufficiently large so as to encompass breakaway point 30 and valley torque 32 if one does occur. So far in the program the microprocessor has determined that the conditions are right for breakaway to have occurred. When eight successive segments have slopes less than the peak x fraction register 53 the chances are very good that the breakaway point 30 has occurred in one of the previously generated 64 samples. The point lableled B1 on the curve of FIG. 2 represents where the breakaway 1 flag may have occurred in a typical test. Note particularly that this flag and thus the beginning of the window "w" could not have been set by short lived spikes in the torque signal.

After the breakaway 1 flag (B1) is set, the microprocessor 42 will continue to convert the analog torque signal into digital samples until 64 more samples are taken after the B1 flag has been set. In FIG. 5B this test 164 is made by looking for a true state for the breakaway 1 flag. A second software counter referred to as counter No. 2 is incremented by 1 every time a new sample is taken (block 190). In test 191 when the contents of counter No. 2 is greater than or equal to 64 the breakaway 2 flag (block 192) is set defining the end of the window as reflected by B2 in FIG. 2. The microprocessor 44 then stops generating any further samples because the end of the window has now been defined. Referring to FIG. 5A the test 158 will be true and test 194 negative so that the microprocessor will now jump to the "Search" routine beginning at block 200 in FIG. 5E and encompassing FIGS. 5C through 5F as well.

Figure 5E:
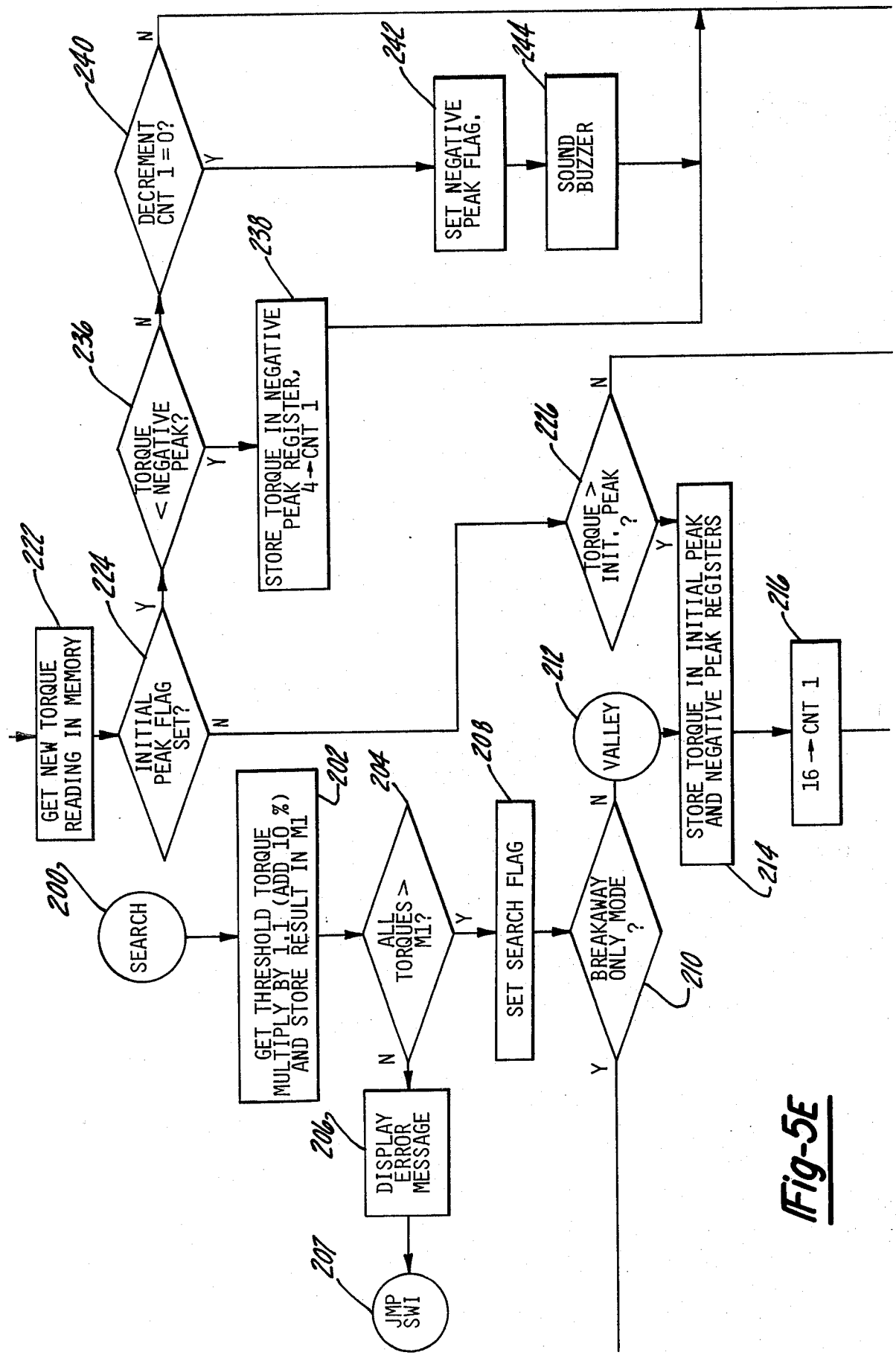
Figure 5F:
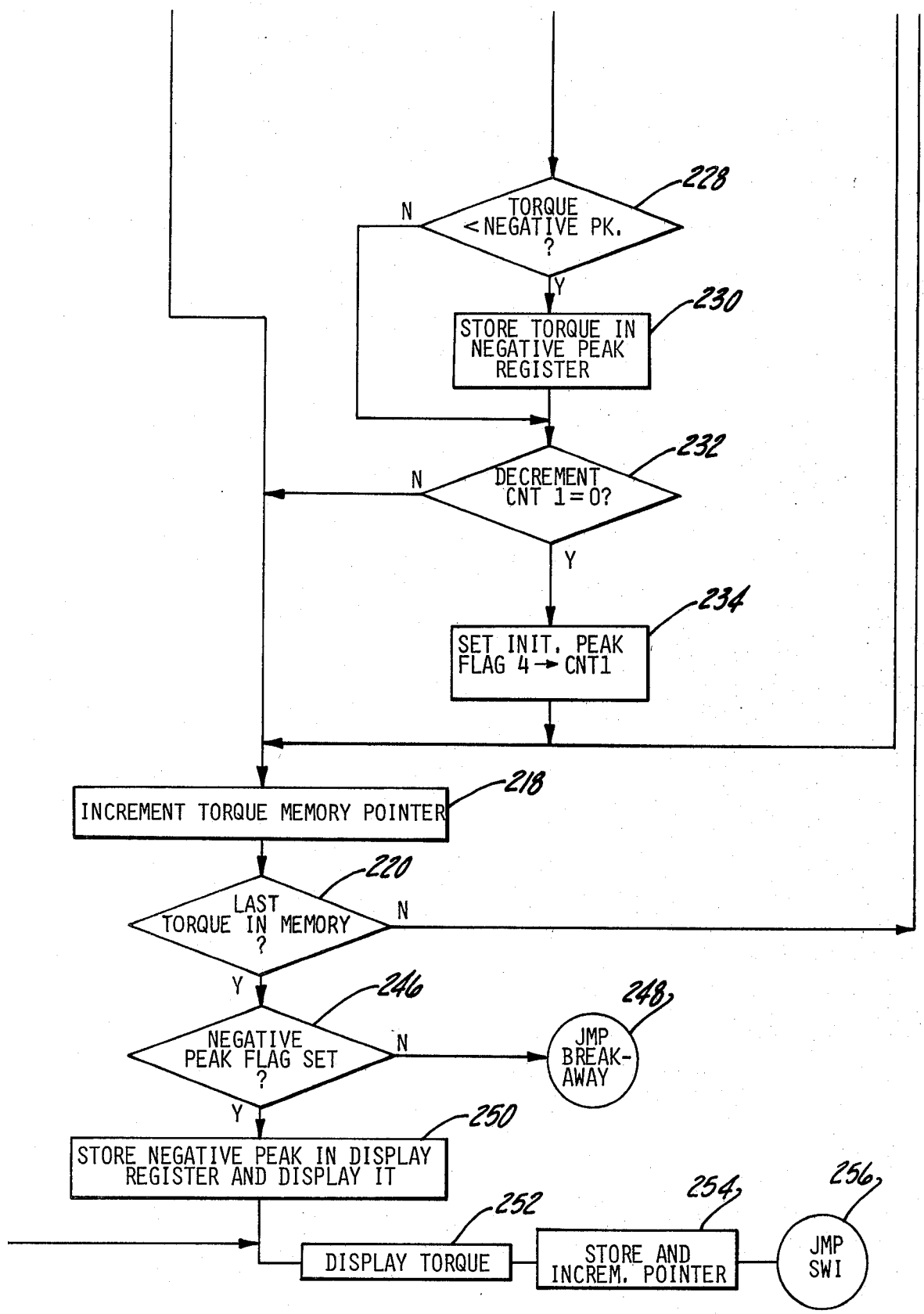
Figure 5G:
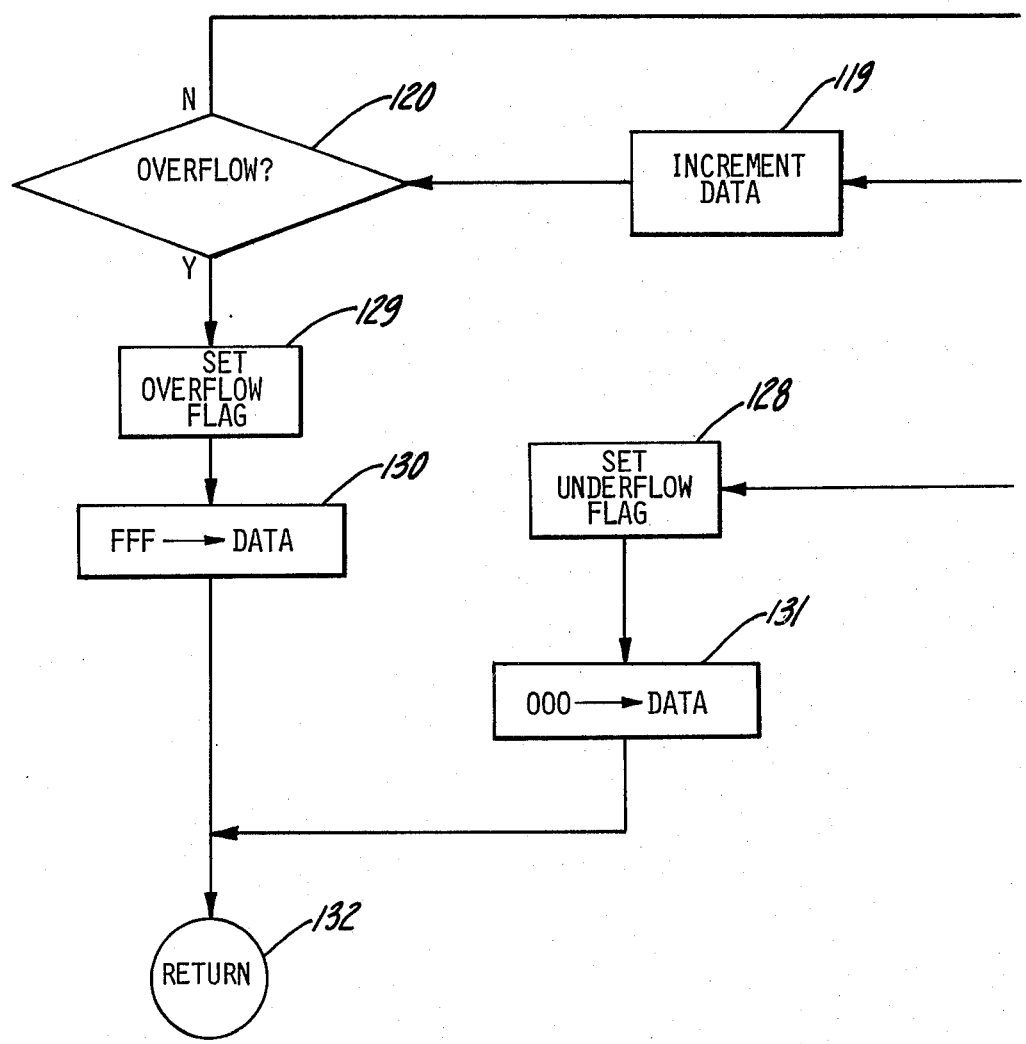
Figure 5H:
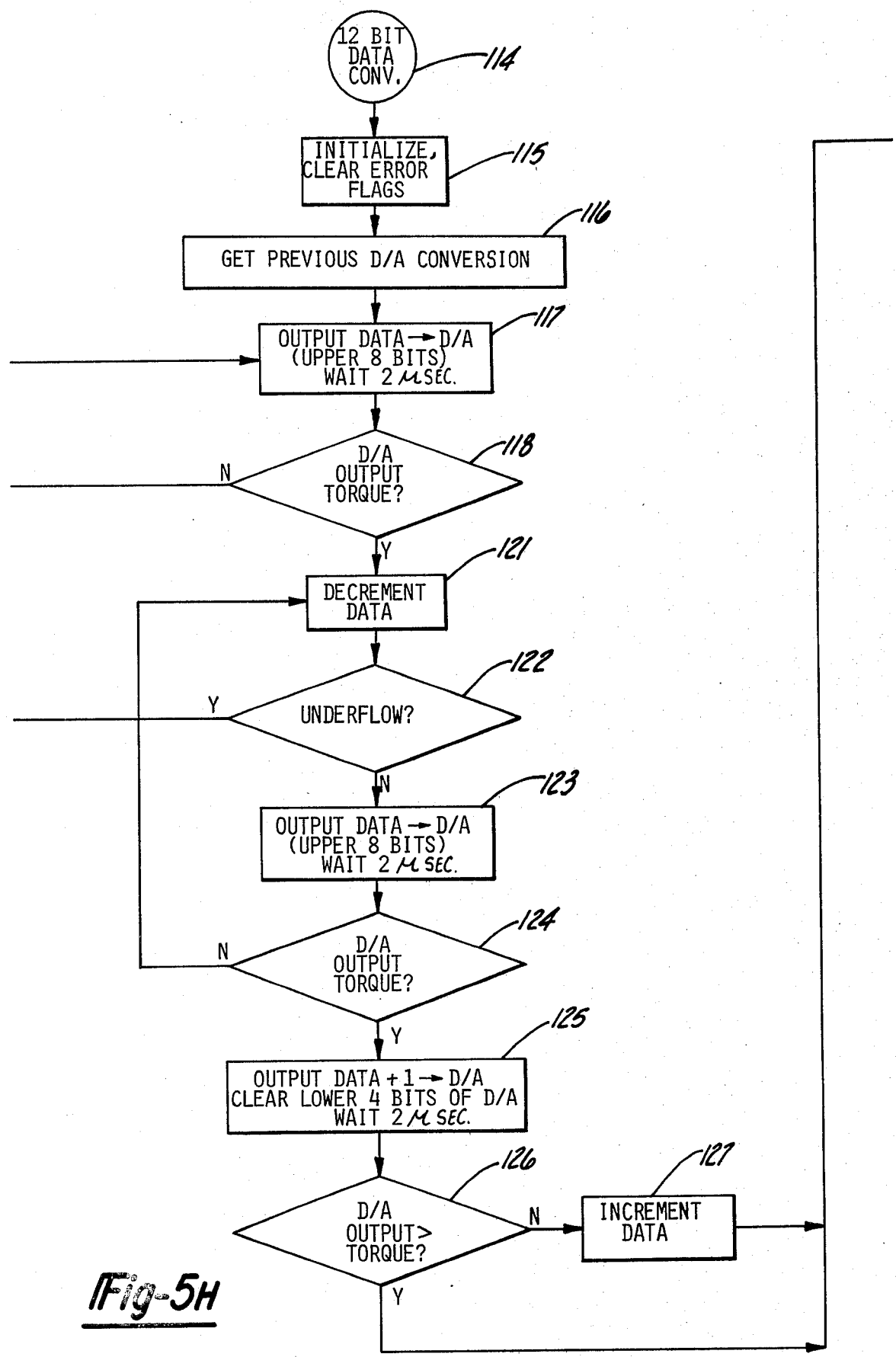
Figure 5J:
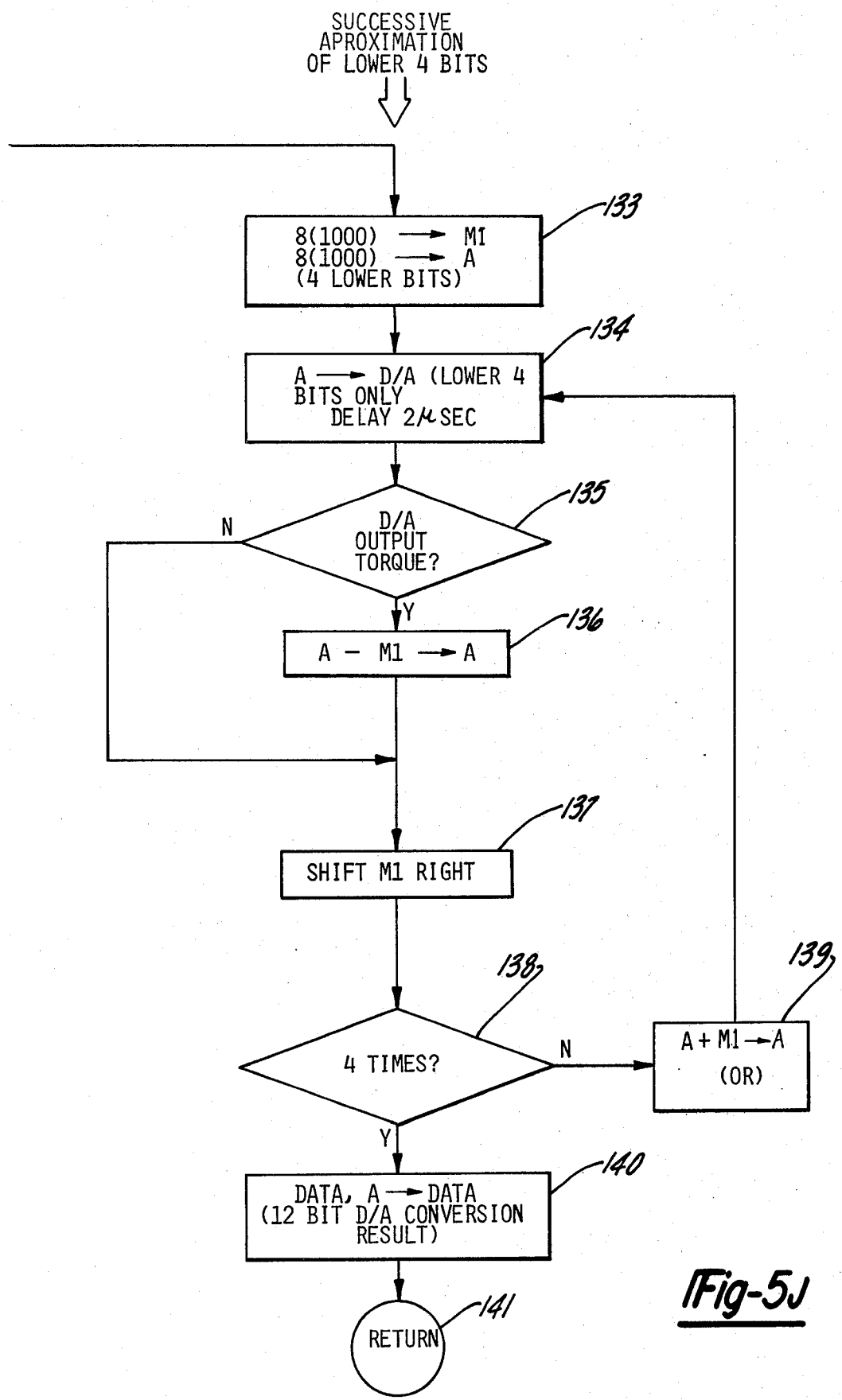

Turning then to FIG. 5E, preliminary steps 200-208 are taken to ensure that all of the sample values within the window are significantly larger than the threshold value as would be expected in a normal test. If for some reason the torque values are below the threshold an error is detected. As noted before, the system may be used in two retorque modes (test 210); one in which only the breakaway torque is detected and the other in which the valley torque is displayed if one occurs and otherwise, just breakaway torque is displayed. The breakaway torque is detected in the same manner in both modes. Therefore, description of the second mode will suffice. In the second mode of operation the microprocessor searches the window for a valley torque level 32 if one, in fact, occurred during the test of the particular fastener. In operational step 214 the microprocessor begins with the first sample in the window and stores that value in initial peak register 54 and negative peak register 56 (FIG. 3). A software counter referred to as counter No. 1 is loaded with the number 8 as reflected by step 216. A software pointer referred to as a torque memory pointer is incremented to fetch or point to the next sample in the window (steps 218-222). The microprocessor then begins to search for an initial peak which is defined as a data sample which is followed by 8 consecutive samples of lesser value. Until such time as this occurs the initial peak flag will not be set as reflected by test 224 (FIG. 5E). If the torque value is greater than the contents of the initial peak register then the new torque value will replace that of the old in the initial peak register. If the new sample is less than the value in the peak register, step 228 (FIG. 5F) asks whether the torque value is less than the contents of the negative peak register. If so, the torque value is stored in the negative peak register 56 replacing the old value. Counter number 1 is then decremented and checked to determine whether it has been reduced to zero. If so, the initial peak flag will be set and the number 4 loaded into counter No. 1 (operation 234). Once the initial peak has been detected, subsequent data sample values are interrogated to determine whether they are less than the contents of the negative peak register (test 236). If so, the new torque value is stored as the new value in the negative peak register and counter No. 1 is reset with the count of 4. However, once four successive readings are greater than the contents of the negative peak register the negative peak flag is set and the buzzer is beeped twice (steps 240-244). Once the negative peak flag has been set (test 246 of FIG. 5F) the value of the negative peak register is stored in a register (not shown) associated with display 16 and the display is activated to illustrate the negative valley torque on the digits of LCD 86.

Summarizing, the negative valley search checks for a sample followed by 8 samples of lesser value. This "detects" the left side or "hill" of the valley. The right side is detected when four consecutive samples of increasing values are sensed. The least positive value in the interim is chosen as the valley torque.

On the other hand, if a valley torque was not detected (or this mode was not selected) the test 246 causes the microprocessor 44 to jump to the breakaway routine beginning at symbol 258 of FIG. 5C.

Figure 6:
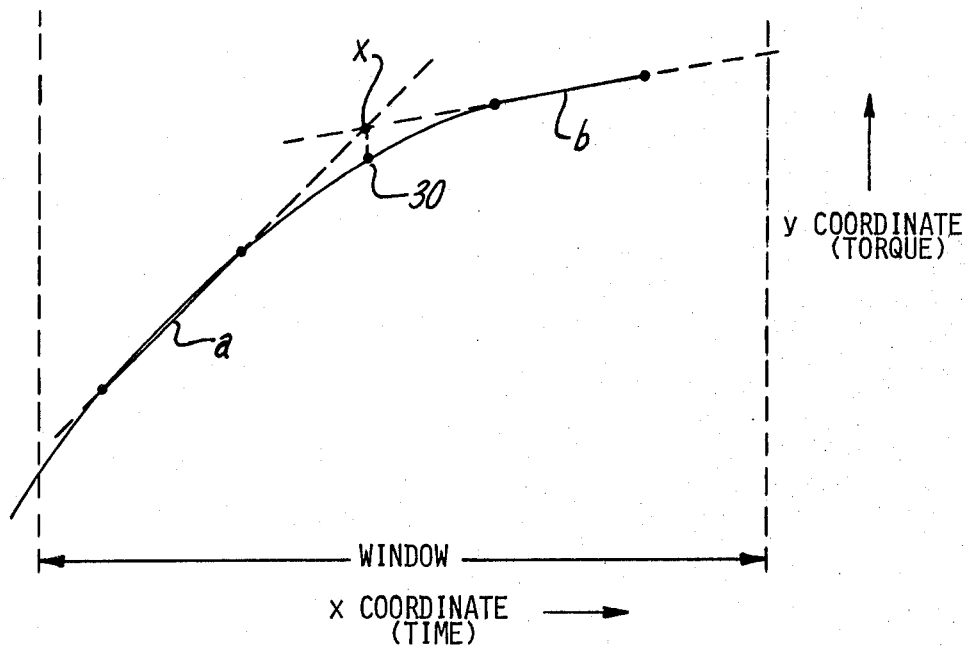
FIG. 6 is a curve illustrating the breakaway value detection of the preferred embodiment.

Reference to FIG. 6 will aid in the understanding of the operation of the breakaway torque detection scheme. FIG. 6 shows an enlargement of the window of 40 samples being examined. According to the preferred embodiment the breakaway point 30 is determined by the intersection point of two lines "a" and "b". Line a is the first segment within the window with a slope that is less than or equal to the contents of the peak x fraction register 53. In order for this segment to be valid, the next four segments following it must have lesser slope values. Line b is the segment with the least positive slope within the window. Operations 262–270 cooperate to interrogate each segment. Each segment is much smaller than the size of the segments used in the initial window definition process. Here, the segments are ten samples wide in comparison with the 50 sample wide segments used during the window definition process. After these tests are completed, the slope of line segment b is stored in the minimum slope register 58 and the end point of the segment is saved in a register referred to as location 1 register.

Steps 274 to 284 define line a. Test 274 determines the first segment to have a slope less than contents of the peak x fraction register 53. The end point of line segment a is stored in a location 2 register assuming that the next four segment tests will result in the setting of flag 1 indicating that a valid line segment a has been discovered. Otherwise, counter 1 is cleared and steps 274–284 are repeated. In the event that the segment b with the least positive slope overlaps segment a, i.e. the end points are less than 10 samples apart as represented by test 294, then the breakaway torque is defined as the torque value associated with the first sample in the segment having the minimum slope. Ordinarily, however, this is not the case and the microprocessor will progress to the operations reflected in box 298. The location 1 register will contain sufficient information to define the coordinates of the beginning and end points of segment b. Similarly, the location 2 register contains sufficient information to define the coordinates of the two end points of line segment a. In this example the X coordinates represent time and the Y coordinates represent torque values. Using straight forward algebraic techniques, the microprocessor 44 solves for the X coordinates of the inersection of the projections of lines a and b. This intersection point X (shown in FIG. 6) will determine the time coordinate of the sample in the window where breakaway occurred. The torque value stored in this memory location is then read and displayed as breakaway torque 30.

Other types of breakaway detection schemes could be utilized. For example, one of the sample values associated with the segment having the least positive slope could be identified as the breakaway torque. However, the sample values at the knee of the torque curve do not necessarily follow a smooth progression under normal operating conditions. Consequently, the detection of the breakaway torque using only this one criteria may not always provide precision results. In contrast, more consistent precise results are obtained using the dual criteria projection scheme of the present invention. The intersection of the two line segment projections will almost always result in accurately pinpointing the breakaway torque value even though there may be some discontinuity in a smooth progression of the torque readings.

In view of the foregoing description it should now be appreciated that the present invention provides the capability of accurately detecting the amount of torque previously applied to a fastener. During the window definition portion of the detection scheme the microprocessor need not make sophisticated calculations and accordingly, can devote most of its time to taking closely spaced samples from the analog input torque signals. Accordingly, a high resolution of digital samples are obtained. Even though over about 1,000 samples are generated during a typical test the size of the memory need not be that large because of the way that the window is defined. In the present invention the RAM window memory only stores about 128 sample values. By keeping the memory size to a minimum costs can be reduced.

One of the most important features is the ability to accurately pinpoint the breakaway or valley torque even though the input torque signal is somewhat eratic. The effect of the spikes 36 will be effectively ignored by the system. The spikes will not enter into the detection scheme if they occur between the end points of the segments whose slopes are being tested. In the event that the spikes do occur at these end points the repetitious tests made by the microprocessor will filter out these spikes and distinguish them from true trends in the torque signal. For example, the window is not defined until eight consecutive segments have slopes less than the contents of the peak x fraction register 53. Accordingly, the system makes sure that it relys only on valid readings.

Still other advantages of the present invention will become apparent to one skilled in the art after a study of the specification, drawings and claims. For example, the electronic circuitry need not be limited to employment just with a hand torque wrench but could alternatively be used with an automated system. Also, an angle decoder could be used to generate a torque versus angle of fastener rotation curve instead of the torque versus time curve of the disclosed embodiment.

We claim:

1. In a method of detecting breakaway or valley torque levels associated with the amount of previously applied torque to a fastener wherein torque is subsequently applied to the fastener in the tightening direction until further motion of the fastener is obtained, and wherein an analog signal is generated as a function of the subsequently applied torque, the improvement comprising:
   (a) defining a window of digital sample values in a memory by using a microprocessor to sample the analog signal and generate digital sample values therefrom until an analysis of said samples indicate that samples corresponding to the breakaway and/or valley torque levels have been stored in memory; and
   (b) thereafter, using said microprocessor to examine the characteristics of the samples within the window to search for those samples corresponding to the breakaway and/or valley torque levels.

2. The method of claim 1 wherein step (a) is carried out by:
   storing said samples in successive memory locations;
   comparing the slopes of segments of said samples;
   storing the maximum slope of the segments;
   setting a flag when a given number of consecutive segments have slopes less than the maximum slope; and
   terminating the generation of more samples after a preselected number of samples are generated after the setting of the flag.

3. The method of claim 2 wherein step (b) is carried out by:
   identifying a sample which is followed by a given number of consecutive samples of lesser values;
   thereafter, storing in a negative peak register the sample with the least positive value; and
   displaying the contents of the negative peak register as the valley torque level when a preselected number of consecutive samples have greater values than the value of the sample stored in said register.

4. The method of claim 2 wherein step (b) is carried out by:
   detecting a first segment of samples in said window having a slope less than said maximum slope;
   detecting a second segment in the window having the least positive slope; and
   displaying as said breakaway torque level the value of the digital sample associated with the intersection of projections from said first and second segments.

5. A method of detecting the amount of previously applied torque to a fastener, said method comprising:
   subsequently applying torque to the fastener in the tightening direction until further motion is obtained;
   generating an analog signal as a function of the subsequently applied torque;
   using a microcomputer to convert said analog signal into a plurality of digital samples;
   loading said samples in a memory while checking for substantial deviations between the slopes of successive sample segments;
   terminating the conversion and loading operations when the slopes of successive sample segments deviate from a given value thereby defining a window of digital samples in said memory; and
   examining the digital samples in said window for a value which is closely associated with the amount of previously applied torque to the fastener.

6. In a system for measuring the amount of previously applied torque to a fastener, the improvement comprising:
   input means for receiving an analog torque signal representative of the amount of torque subsequently applied to the fastener until motion is obtained;
   converter means for converting said analog torque signal into a plurality of digital samples;
   memory means for storing a given number of said samples;
   means for loading said samples into sequential memory locations until the slopes of successive sample segments deviate substantially from a given value thereby defining a window of digital samples in said memory; and
   means for examining said digital samples stored in the window for a value associated with the amount of torque previously applied to the fastener.

7. The improvement of claim 6 wherein said converter means includes a comparator having at least two inputs, one input being coupled for receipt of said analog signal;
   a microprocessor having inputs and outputs; and
   a digital to analog converter having an input coupled to an output of said microprocessor and an output coupled to the other input of said comparator.

8. The improvement of claim 6 which further comprises a torque wrench having an electronic display for providing a visual indication of the amount of previously applied torque.

9. A method of determining the breakaway torque level associated with the amount of previously applied torque to a fastener, said method comprising:
   generating a curve of torque values representing the amount of torque subsequently applied to the fastener until motion is obtained;
   detecting a first line segment on the curve having a slope which first begins to substantially deviate from the maximum slope of the curve;
   detecting a second line segment on the curve having the least positive slope; and
   displaying as said breakaway torque level the value on the curve associated with the intersection of projections from the first and second line segments.

10. In an apparatus for detecting breakaway or valley torque levels associated with the amount of previously applied torque to a fastener wherein torque is subsequently applied to the fastener in the tightening direction until further motion of the fastener is obtained, and wherein an analog signal is generated as a function of the subsequently applied torque, wherein the improvement comprises:
    means for sampling the analog signal and generating digital sample values;
    means for storing said samples in a digital memory until an analysis of said samples indicates that samples corresponding to the breakaway and/or valley torque levels have been generated and stored in memory; and
    means for examining the characteristics of the samples in the memory to search for samples corresponding to the breakaway and/or valley torque levels.

* * * * *